3,012,939
NEW DIHALOGENANDROSTENES AND PROCESS FOR THEIR MANUFACTURE
Albert Wettstein, Riehen, and Georg Anner and Ludwig Ehmann, Basel, Switzerland, assignors to Ciba Pharmaceutical Products Inc., Summit, N.J.
No Drawing. Filed July 8, 1960, Ser. No. 41,493
Claims priority, application Switzerland July 9, 1959
21 Claims. (Cl. 167—65)

The present invention provides, new highly androgenic dihalogeno-androstenes of the formula

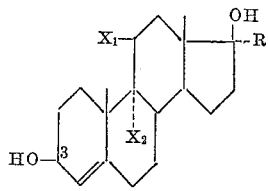

in which $X_1$ stands for a chlorine or fluorine atom; $X_2$ for a chlorine or bromine atom; and R for a hydrogen atom or an alkyl radical, preferably one containing 1 to 6 carbon atoms, such as the methyl, ethyl, propyl or isobutyl group, and esters thereof.

The products of the present process are obtained when a compound of the formula

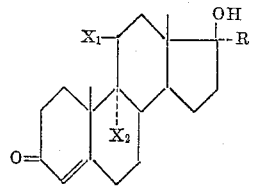

in which $X_1$, $X_2$ and R have the above meanings—or an ester is reduced with a complex light-metal hydride and, if desired, the resulting compound is esterified or hydrolysed.

For the reduction according to the present invention the starting material is treated with a complex light-metal hydride, for example lithium aluminium hydride, lithium borohydride, sodium borohydride or potassium borohydride, alkoxyaluminium-hydride, alkoxy-borohyride, such as lithium tritertiary butoxy aluminium hydride or sodium trimethoxy-borohydride, in the presence of a suitable solvent, such as ether, dioxane, tetrahydrofuran, an alcohol, or ethyl acetate. The $\Delta^4$-3-hydroxy compound is isolated in the known manner, for example by crystallization and/or chromatography. In contradistinction to the starting materials, the products of the present process produce a characteristic red coloration with concentrated sulfuric acid.

The resulting $\Delta^4$-9$\alpha$:11$\beta$-dihalogeno-androstene-3$\beta$:17$\beta$-diols or -17$\alpha$-alkyl-androstene-3$\beta$:17$\beta$-diols respectively can be esterified by a known method in position 3 and, if desired, also in position 17. The acid radicals in these esters are those of saturated or unsaturated aliphatic, cycloaliphatic, aromatic or heterocyclic carboxylic acids, acids belonging simultaneously to more than one of these series, preferably those having from 1 to 20 carbon atoms, for example of formic acid, acetic acid, propionic acid, butyric acids, valeric acids such as n-valeric acid or trimethylacetic acid, of the caproic acids such as $\beta$-trimethylpropionic acid or diethylacetic acid, of the enanthic, caprylic, pelargonic, capric, unecylic acids, for example of undecylenic acid, of lauric, myristic, palmitic or stearic acid, for example of oleic acid, cyclopropyl-, -butyl-, -pentyl- and -hexylcarboxylic acid, cyclopropylmethylcarboxylic acid, cyclobutylmethylcarboxylic acid, of cyclopentyl-ethylcarboxylic acid, cyclohexylethylcarboxylic acid, cyclopentyl-, cyclohexyl- or phenylacetic or -propionic acids, of benzoic acid, phenoxyalkanoic acids such as phenoxyacetic acid, para-chlorophenoxyacetic acid, 2:4-dichlorophenoxyacetic acid, 4-tertiary butyl-phenoxyacetic acid, 3-phenoxypropionic acid, 4-phenoxybutyric acid, of furan-2-carboxylic acid, 5-tertiary butyl-furan-2-carboxylic acid, 5-bromo-furan-2-carboxylic acid, of the nicotinic acids, of $\beta$-ketocarboxylic acids, for example of acetoacetic acid, propionylacetic, butyrylacetic or caprionylacetic acid, of amino acids such as diethylaminoacetic acid, aspartic acid and the like. Instead of being derived from carboxylic acids, the said residues may also be those of sulfonic acids, or of phosphoric, sulfuric or hydrohalic acids.

Special importance attaches to esters that contain a group imparting solubility in water, such as hydroxyl, carboxyl or amino group, since they are suitable for the preparation of aqueous solutions. The resulting semiesters are derived from dicarboxylic acids, for example from oxalic, succinic, maleic, glutaric, dimethylglutaric, pimelic, acetone - dicarboxylic, acetylenedicarboxylic, phthalic, tetrahydrophthalic, hexahydrophthalic, endomethylene-tetrahydrophthalic, endomethylene-hexahydrophthalic, endoxyhexahydrophthalic, endoxy-tetrahydrophthalic acid, camphoric acid, cyclopropane- or cyclobutane-dicarboxylic acid, diglycollic acid, ethylene-bis-glycollic acid, polyethylene-bis-glycollic acids, thioglycollic acid, furan-, dihydrofuran- or tetrahydrofurandicarboxylic acids, quinolic or cinchomeronic acid, and also from polyethyleneglycol monoalkyl ether semi-esters of the afore-mentioned dicarboxylic acids, or from polybasic inorganic acids such as sulfuric or phosphoric acids or the like.

In the semi-esters obtained in this manner the free acid group of the dicarboxylic acid used or polybasic inorganic acids may be further esterified. Thus, for example, reaction with diazomethane in methanol+ether yields the methyl esters of the 3-semidigycollates, 3-semisuccinates and others.

The esters are obtained with the specified acids, their halides, anhydrides, thiol derivatives or ketones; transesterification methods are likewise suitable. For the manufacture of the water-soluble salts the semi-esters are reacted in the known manner, for example with a hydroxide, carbonate or bicarbonate of an alkali metal, more especially with sodium bicarbonate, or with an organic base such as ethanolamine, diethanolamine, triethanolamine, dibenzylethylenediamine, ephedrine or $\alpha$-1-phenyl-2-methylaminopropane. It is a special advantage of these semi-esters that they form relatively stable aqueous solutions with the aforementioned organic and inorganic bases.

The starting materials may be prepared as described in U.S. patent application Ser. No. 36,161, filed September 15, 1960, by Wettstein et al.

The present invention further includes preparations for use in human and veterinary medicine, containing the above halogeno-androstenes in conjunction with a solid or liquid pharmaceutical excipient. These preparations are formulated by the conventional methods, for example with the use of organic or inorganic pharmaceutical excipients suitable for parenteral, enteral or local administration. Suitable excipients are substances that do not react with the products of the present process, such, for example, as water, vegetable oils, benzyl alcohols, polyethylene glycols, gelatine, lactose, starches, magnesium stearate, talc, white petroleum jelly, cholesterol or other pharmaceutical excipients. The preparations are primarily intended for parenteral administration and are in the form of solutions, above all oily or aqueous solutions, or suspensions, emulsions or implants; for enteral administration there are further suitable tablets and dragees, and for local administration the preparations are in the form of ointments or creams. If desired, the preparations may be sterilized or admixed with assistants, such as preserving, stabilizing, wetting or emulsifying agents, salts for regulating the osmotic pressure or buffers. They may also contain other therapeutically useful substances. The content of active substance in these preparations, such as in an ampoule, is preferably 0.1–200 mg. or 0.03–60%.

The following examples illustrate the invention.

Example 1

A clear solution of 10.0 grams of 9α-chloro-11β-fluoro-17α-methyl-testosterone in 1300 cc. of methanol and 200 cc. of ethyl acetate is cooled to −5° C. and 2.5 grams of sodium borohydride are tipped in which dissolves rapidly with slight evolution of hydrogen after the vessel has been rotated a few times. The progress of the reduction is observed by periodically checking the ultra-violet absorption; after about 2 hours calculated from the addition of the sodium borohydride α:β-unsaturated ketone can no longer be detected in the ultra-violet spectrum, while a simultaneous spot test with silver nitrate still reveals the presence of excess sodium borohydride. The mixture is kept overnight at 0° C. and the clear reaction solution is treated first with 10 cc. of water and then with 50 cc. of 0.5 N-acetic acid [pH=6–7]. The clear solution is concentrated under reduced pressure at 40–50° to about 100 cc., 300 cc. of water are added, and the whole is again concentrated in vacuo to 100 cc., then diluted with 500 cc. of water, and the precipitated reaction production is suctioned off, thoroughly washed with water and dried, to yield 9.4 grams of Δ$^4$-9α-chloro-11β-fluoro-3β:17β-dihydroxy-17α-methyl-androstene which is recrystallized from acetone for analysis.

For the reduction according to the present process sodium trimethoxy borohydride may also be used.

In an analogous manner there is obtained by reduction with sodium borohydride from 9α:11β-dichloro-17α-methyl-testosterone the Δ$^4$-9α:11β-dichloro-3β:17β-dihydroxy-17α-methyl-androstene; from 9α-bromo-11β-fluoro-17α-methyl-testosterone the Δ$^4$-9α-bromo-11β-fluoro-3β:17β-dihydroxy-17α-methyl-androstene; and from 9α-bromo-11β-chloro-17α-methyl-testosterone the Δ$^4$-9α-bromo-11β-chloro-3β:17β-dihydroxy-17α-methyl-androstene.

Example 2

A solution of 3.57 grams of Δ$^4$-9α-chloro-11β-fluoro-3β:17β-dihydroxy-17α-methyl-androstene in 50 cc. of pyridine is treated with 10 cc. of acetanhydride and kept overnight at room temperature. The reaction solution is poured into ice-water and the precipitate is suctioned off, washed with much water and dried. Recrystallization from ethyl acetate or acetone yields pure Δ$^4$-9α-chloro-11β-fluoro-3β:17β-dihydroxy-17α-methyl-androstene-3-acetate. Yield: 74% of theory.

An analogous reaction of Δ$^4$-9α-chloro-11β-fluoro-3β:17β-dihydroxy-17α-methyl-androstene with propionic anhydride in pyridine yields the Δ$^4$-9α-chloro-11β-fluoro-3β:17β-dihydroxy-17α-methyl-androstene-3-propionate in a yield of 76% of theory.

Example 3

A mixture of 3.5 grams of Δ$^4$-9α-bromo-11β-fluoro-3β:17β-dihydroxy-17α-methyl-androstene, 50 cc. of pyridine and 10 cc. of acetanhydride is kept overnight at room temperature. The clear reaction solution is poured over ice, and the precipitate is suctioned off, washed and dried under reduced pressure at 40–60° C. Recrystallization from ether+petroleum ether produces a 70% yield of Δ$^4$-9α-bromo-11β-fluoro-3β:17β-dihydroxy-17α-methyl-androstene-3-acetate.

An analogous reaction of Δ$^4$-9α-bromo-11β-fluoro-3β:17β-dihydroxy-17α-methyl-androstene with propionic anhydride yields Δ$^4$-9α-bromo-11β-fluoro-3β:17β-dihydroxy-17α-methyl-androstene-3-propionate.

Example 4

A solution of 3.5 grams of Δ$^4$-9α-bromo-11β-chloro-3β:17β-dihydroxy-17α-methyl-androstene in 50 cc. of pyridine is treated with 10 cc. of propionic anhydride and kept for 24 hours at room temperature. The reaction mixture is poured into ice-water, whereupon the reaction product separates out; it is suctioned off, washed with water and dried. Recrystallization from acetone yields pure Δ$^4$-9α-bromo-11β-chloro-3β:17β-dihydroxy-17α-methyl-androstene-3-propionate.

An analogous reaction of Δ$^4$-9α-bromo-11β-chloro-3β:17β-dihydroxy-17α-methyl-androstene with acetanhydride yields Δ$^4$-9α-bromo-11β-chloro-3β:17β-dihydroxy-17α-methyl-androstene-3-acetate.

Example 5

A solution of 3.57 grams of Δ$^4$-9α-chloro-11β-fluoro-3β:17β-dihydroxy-17α-methyl-androstene in 50 cc. of pyridine is treated within 30 minutes at 20–25° C. with a solution of 2.0 cc. of trimethylacetyl chloride in 25 cc. of pyridine. The mixture is kept overnight at room temperature and then worked up as described in Example 4. Recrystallization from ethyl acetate produces 3.2 grams of Δ$^4$-9α-chloro-11β-fluoro-3β:17β-dihydroxy-17α-methyl-androstene-3-trimethylacetate.

In an identical manner there is obtained by the reaction of trimethylacetyl chloride in pyridine with Δ$^4$-9α:11β-dichloro-3β:17-dihydroxy-17α-methyl-androstene — the Δ$^4$-9α:11β-dichloro-3β:17β-dihydroxy-17α-methyl-androstene-3-trimethylacetate, With Δ$^4$-9α-bromo-11β-chloro-3β:17β-dihydroxy-17α-methyl-androstene — the Δ$^4$-9α-bromo-11β-chloro-3β-17β-dihydroxy-17α-methyl-androstene-3-trimethylacetate, and With Δ$^4$-9α-bromo-11β-fluoro-3β:17β-dihydroxy-17α-methyl-androstene — the Δ$^4$-9α-bromo-11β-fluoro-3β:17β-dihydroxy-17α-methyl-androstene-3-methylacetate.

Example 6

A solution of 3.57 grams of Δ$^4$-9α-chloro-11β-fluoro-3β:17β-dihydroxy-17α-methyl-androstene in 50 cc. of pyridine is heated with 2.0 grams of succinic anhydride under nitrogen for 30 minutes on a boiling water bath. The mixture is cooled, poured into dilute hydrochloric acid, suction-filtered, and the filter residue is washed with dilute hydrochloric acid and then with water, dried and recrystallized from methanol, to yield Δ$^4$-9α-chloro-11β-fluoro-3β:17β-dihydroxy-17α-methyl-androstene-3-semisuccinate.

To prepare the water-soluble sodium salt of Δ$^4$-9α-chloro-11β-fluoro-3β:17β-dihydroxy-17α-methyl-androstene-3-semi-succinate, 0.457 gram thereof is dissolved in 11 cc. of 0.1 N-sodium bicarbonate solution, the solution is filtered until it is clear and then lyophilized in the known manner, to yield 0.48 gram of the sodium salt of Δ$^4$-9α-chloro-11β-fluoro-3β:17β-dihydroxy-17α-methyl-androstene-3-semisuccinate.

An analogous reaction of Δ$^4$-9α-chloro-11β-fluoro-3β:17β-dihydroxy-17α-methyl-androstene-3-semisuccinate with triethanolamine yields the triethanolamine salt of Δ$^4$-9α-chloro-11β-fluoro-3β:17β-dihydroxy-17α-methyl-androstene-3-semisuccinate.

Example 7

A mixture of 3.57 grams of Δ$^4$-9α-chloro-11β-fluoro-3β:17β-dihydroxy-17α-methyl-androstene, 2.3 grams of diglycollic anhydride and 50 cc. of pyridine is heated under nitrogen for 30 minutes at 100° C. The cooled reaction solution is poured into ice-water, taken up in methylene chloride, and the extract is washed with dilute hydrochloric acid and water, dried over sodium sulphate and evaporated. The residue is recrystallized from methanol and yields $\Delta^4$-9$\alpha$-chloro-11$\beta$-fluoro-3$\beta$:17$\beta$-dihydroxy-17$\alpha$-methyl-androstene-3-semidiglycollate.

In an analogous manner there are obtained by reaction with diglycollic anhydride:

From $\Delta^4$-9$\alpha$:11$\beta$-dichloro-3$\beta$:17$\beta$-dihydroxy-17$\alpha$-methyl-androstene—the $\Delta^4$-9$\alpha$:11$\beta$-dichloro-3$\beta$:17$\beta$-dihydroxy-17$\alpha$-methyl-androstene-3-semidiglycollate, From $\Delta^4$ - 9$\alpha$ - bromo - 11$\beta$-fluoro-3$\beta$:17$\beta$-dihydroxy-17$\alpha$-methyl-androstene — the $\Delta^4$-9$\alpha$-bromo-11$\beta$-fluoro-3$\beta$:17$\beta$-dihydroxy-17$\alpha$ - methyl - androstene-3-semidiglycollate, and From $\Delta^4$-9$\alpha$-bromo-11$\beta$-chloro - 3$\beta$:17$\beta$ - dihydroxy - 17$\alpha$-methyl-androstene — the $\Delta^4$-9$\alpha$-bromo-11$\beta$-chloro-3$\beta$:17$\beta$-dihydroxy-17$\alpha$-methyl - androstene-3-semidiglycollate.

To prepare the water-soluble sodium salt of $\Delta^4$-9$\alpha$-chloro-11$\beta$-fluoro-3$\beta$:17$\beta$-dihydroxy-17$\alpha$-methyl - androstene-3-semidiglycollate, 0.473 gram thereof is dissolved in 11.0 cc. of 0.1 N-sodium bicarbonate solution, the solution is filtered until it is clear and then lyophilized, to yield 0.48 gram of the sodium salt of $\Delta^4$-9$\alpha$-chloro-11$\beta$-fluoro-3$\beta$:17$\beta$-dihydroxy-17$\alpha$-methyl - androstene - 3 - semidiglycollate.

*Example 8*

A mixture of 3.73 grams of $\Delta^4$-9$\alpha$:11$\beta$-dichloro-3$\beta$:17$\beta$-dihydroxy-17$\alpha$-methyl-androstene, 2.0 grams of succinic anhydride and 50 cc. of pyridine is heated under nitrogen for 30 minutes on a boiling water bath and then worked up as described in Example 6, to yield $\Delta^4$-9$\alpha$:11$\beta$-dichloro-3$\beta$:17$\beta$-dihydroxy-17$\alpha$-methyl - androstene-3-semisuccinate.

To prepare the water-soluble sodium salt of $\Delta^4$-9$\alpha$:11$\beta$-dichloro-3$\beta$:17$\beta$-dihydroxy-17$\alpha$-methyl-androstene-3-semisuccinate, 0.473 gram thereof is dissolved in 11.0 cc. of 0.1 N-sodium bicarbonate solution and the solution is lyophilized, to yield 0.5 gram of the sodium salt of $\Delta^4$-9$\alpha$:11$\beta$-dichloro-3$\beta$:17$\beta$-dihydroxy-17$\alpha$-methyl-androstene-3-semisuccinate.

*Example 9*

A mixture of 0.373 gram of $\Delta^4$-9$\alpha$:11$\beta$-dichloro-3$\beta$:17$\beta$-dihydroxy-17$\alpha$-methyl-androstene, 2.7 grams of tetrahydrophthalic anhydride and 100 cc. of pyridine is heated under nitrogen for 30 minutes at 100° C. and worked up as described in Example 6, to yield $\Delta^4$-9$\alpha$:11$\beta$-dichloro-3$\beta$:17$\beta$-dihydroxy-17$\alpha$-methyl-androstene-3-semitetrahydrophthalate.

To prepare the water-soluble sodium salt of $\Delta^4$-9$\alpha$:11$\beta$-dichloro-3$\beta$:17$\beta$-dihydroxy-17$\alpha$-methyl-androstene-3-semitetrahydrophthalate, 0.525 gram thereof is dissolved in 11.0 cc. of 0.1 N-sodium bicarbonate solution and the whole is lyophilized, to yield 0.52 gram of the sodium salt of $\Delta^4$-9$\alpha$-11$\beta$-dichloro-3$\beta$:17$\beta$-dihydroxy-17$\alpha$-methyl-androstene-3-semitetrahydrophthalate.

An analogous reaction of $\Delta^4$-9$\alpha$:11$\beta$-dichloro-3$\beta$:17$\beta$-dihydroxy-17$\alpha$-methyl - androstene - 3 - semi-tetrahydrophthalate with diethanolamine yields the diethanolamine salt of $\Delta^4$-9$\alpha$:11$\beta$-dichloro - 3$\beta$:17$\beta$ - dihydroxy - 17$\alpha$-methyl-androstene-3-semi-tetrahydrophthalate.

*Example 10*

A mixture of 0.357 gram of $\Delta^4$-9$\alpha$-chloro-11$\beta$-fluoro-3$\beta$:17$\beta$-dihydroxy-17$\alpha$-methyl-androstene, 2.7 grams of tetrahydrophthalic anhydride and 100 cc. of pyridine is heated under nitrogen for 30 minutes at 100° and worked up as described in Example 6, to yield $\Delta^4$-9$\alpha$-chloro-11$\beta$-fluoro-3$\beta$:17$\beta$ - dihydroxy-17$\alpha$-methyl-androstene-3-semi-tetrahydrophthalate.

To prepare the water-soluble sodium salt of $\Delta^4$-9$\alpha$-chloro-11$\beta$-fluoro-3$\beta$:17$\beta$-dihydroxy - 17$\alpha$ - methyl-androstene-3-semi-tetrahydrophthalate, 0.509 gram of $\Delta^4$-9$\alpha$-chloro-11$\beta$-fluoro-3$\beta$:17$\beta$-dihydroxy - 17$\alpha$ - methyl-androstene-3-semi-tetrahydrophthalate is dissolved in 11.0 cc. of 0.1 N-sodium bicarbonate solution and the whole is lyophilized, to yield 0.52 gram of the sodium salt of $\Delta^4$-9$\alpha$-chloro - 11$\beta$ - fluoro - 3$\beta$:17$\beta$ - dihydroxy-17$\alpha$-methyl-androstene-3-semi-tetrahydrophthalate.

*Example 11*

A solution of 0.373 gram of $\Delta^4$-9$\alpha$:11$\beta$-dichloro-3$\beta$:17$\beta$-dihydroxy-17$\alpha$-methyl-androstene in 50 cc. of pyridine is treated within 30 minutes at 20–25° C. with a solution of 2.0 grams of benzoyl chloride in 25 cc. of pyridine, and the mixture is allowed to stand overnight at room temperature and then worked up as described in Example 4. Recrystallization from ethyl acetate yields $\Delta^4$-9$\alpha$:11$\beta$ - dichloro-3$\beta$:17$\beta$-dihydroxy - 17$\alpha$ - methyl-androstene-3-benzoate.

In an analogous manner there are obtained by reaction with benzoyl chloride in pyridine:

From $\Delta^4$ - 9$\alpha$ - chloro-11$\beta$-fluoro-3$\beta$:17$\beta$-dihydroxy-17$\alpha$-methylandrostene—the $\Delta^4$-9$\alpha$-chloro-11$\beta$-fluoro-3$\beta$:17$\beta$-dihydroxy-17$\alpha$-methyl-androstene-3-benzoate, From $\Delta^4$-9$\alpha$-bromo - 11$\beta$ - fluoro-3$\beta$:17$\beta$-dihydroxy-17$\alpha$-methyl-androstene—the $\Delta^4$ - 9$\alpha$ - bromo - 11$\beta$ - fluoro-3$\beta$:17$\beta$ - dihydroxy-17$\alpha$-methyl-androstene-3-benzoate, and From $\Delta^4$-9$\alpha$-bromo - 11$\beta$ - chloro-3$\beta$:17$\beta$-dihydroxy-17$\alpha$-methyl-androstene—the $\Delta^4$ - 9$\alpha$ - bromo - 11$\beta$ - chloro-3$\beta$:17$\beta$-dihydroxy-17$\alpha$-methyl-androstene-3-benzoate.

*Example 12*

A solution of 0.373 gram of $\Delta^4$-9$\alpha$:11$\beta$-dichloro-3$\beta$:17$\beta$-dihydroxy-17$\alpha$-methyl-androstene in 20 cc. of pyridine is treated with 0.3 gram of cyclopropane-carboxylic acid anhydride and the whole is heated under nitrogen for 30 minutes on a boiling water bath, kept overnight at room temperature, and the reaction solution is evaporated in vacuo by means of a film still. The residue is taken up in chloroform, and the chloroformic solution is washed successively with dilute hydrochloric acid, water, dilute hydrochloric acid, water, dilute sodium carbonate solution and again with water, dried over sodium sulfate, filtered and evaporated. On recrystallization from methanol the residue yields $\Delta^4$-9$\alpha$:11$\beta$-dichloro-3$\beta$:17$\beta$-dihydroxy-17$\alpha$-methyl-androstene-3-cyclopropylformate.

In an analogous manner there are obtained by reaction with cyclopropane-carboxylic acid anhydride in pyridine:

From $\Delta^4$-9$\alpha$-chloro-11$\beta$-fluoro - 3$\beta$:17$\beta$ - dihydroxy - 17$\alpha$-methyl-androstene—the $\Delta^4$ - 9$\alpha$ - chloro - 11$\beta$ - fluoro-3$\beta$:17$\beta$-dihydroxy - 17$\alpha$ - methyl-androstene - 3 - cyclopropylformate, From $\Delta^4$-9$\alpha$-bromo - 11$\beta$ - chloro-3$\beta$:17$\beta$-dihydroxy-17$\alpha$-methyl-androstene—the $\Delta^4$ - 9$\alpha$ - bromo - 11$\beta$ - chloro-3$\beta$:17$\beta$ - dihydroxy - 17$\alpha$ - methyl-androstene-3-cyclopropylformate, and From $\Delta^4$-9$\alpha$-bromo - 11$\beta$ - fluoro - 3$\beta$:17$\beta$-dihydroxy-17$\alpha$-methyl-androstene—the $\Delta^4$ - 9$\alpha$ - bromo - 11$\beta$ - fluoro-3$\beta$:17$\beta$ - dihydroxy - 17$\alpha$ - methyl-androstene-3-cyclopropylformate.

*Example 13*

0.8 gram of liquid sulphur trioxide is added dropwise under nitrogen at −10° C. to −5° C. to 30 cc. of dry pyridine. A solution of 3.8 grams of $\Delta^4$-9$\alpha$:11$\beta$-dichloro-3$\beta$:17$\beta$-dihydroxy-17$\alpha$-methyl-androstene in 30 cc. of dry pyridine is then run with continuous cooling within 30 minutes into the pyridine/sulfur trioxide adduct in pyridine. The reaction mixture is then stirred for 1–2 hours at 0° C., whereby the pyridine/sulfur trioxide adduct gradually dissolves, and is then kept for 2–3 hours at room temperature. The pyridine is extensively removed by vacuum distillation in a rotary film still. The resulting residue is repeatedly digested with dry ether until crystallization sets in, the crystalline magma is covered with dry ether and kept overnight, then suction-filtered, and the crystallizate is dissolved in 90 cc. of methanol and the solution is titrated with N-sodium methylate solution to pH 9. The sodium sulfate precipitated during the titration is separated, and the filtrate is concentrated at 40° C. under reduced pressure with the aid of a rotary film still. The concentrated solution is cooled to —40° C. to —50° C. and slowly stirred into ether. The resulting crystal suspension is cooled overnight, then suction-filtered, washed with a small amount of ether and dried, to yield 3 to 4 grams of the water-soluble sodium salt of $\Delta^4$-9α:11β - dichloro - 3β:17β - dihydroxy-17α-methyl-androstene-3-semisulfate.

A solution of 0.5 gram of the sodium salt of $\Delta^4$-9α:11β-dichloro-3β:17β-dihydroxy - 17α - methyl - androstene-3-semi-sulfate in 50 cc. of methanol is slowly percolated through a column of Amberlite IR–120 prepared with dilute hydrochloric acid and methanol; the column is rinsed with methanol until the issuing filtrate has practically ceased to display any absorption in the ultra-violet spectrum at 240 mμ. The filtrate is concentrated by the film still at a temperature not exceeding 40° C., and diluted with ether, whereupon $\Delta^4$-9α:11β-dichloro-3β:17β-dihydroxy-17α - methyl-androstene-3-semi-sulfate precipitates. The crystals are kept overnight in a refrigerator and then suction-filtered and dried. Yield: 0.4 gram of $\Delta^4$-9α:11β-dichloro - 3β:17β - dihydroxy-17α-methyl-androstene-3-semi-sulfate which gives a clear solution in dilute sodium bicarbonate solution.

In an analogous manner the reaction of $\Delta^4$-9α-chloro-11β-fluoro-3β:17β-dihydroxy-17α-methyl-androstene with pyridine/sulfur trioxide adduct yields the $\Delta^4$-9α-chloro-11β-fluoro-3β:17β-dihydroxy - 17α - methyl-androstene-3-semi-sulfate; its water-soluble sodium salt can be prepared in likewise analogous manner.

*Example 14*

A solution of 0.4 gram of $\Delta^4$-9α:11β-dichloro-3β:17β-dihydroxy-17α-methyl-androstene-3-semi-succinate in 20 cc. of methanol is cooled with ice-water and treated with an ethereal solution of diazomethane until the yellow coloration no longer disappears. Glacial acetic acid is then added dropwise until the mixture is decolorized; it is concentrated in vacuo until crystallization sets in and then kept overnight in a refrigerator, and the crystallizate is suctioned off, to yield 0.2 gram of the methyl ester of $\Delta^4$-9α:11β-dichloro-3β:17β-dihydroxy - 17α - methylandrostene-3-semisuccinate. The mother liquor yields a further amount of the methyl ester on being concentrated.

In an analogous manner there are obtained by reaction with diazomethane.

From $\Delta^4$ - 9α:11β - dichloro - 3β:17β - dihydroxy - 17α-methyl-androstene-3-semi-diglycollate—the methyl ester of $\Delta^4$ - 9α:11β - dichloro - 3β:17β - dihydroxy - 17α-methyl-androstene-3-semidiglycollate, From $\Delta^4$ - 9α:11β - dichloro - 3β:17β - dihydroxy - 17α-methyl - androstene - 3 - semi-tetrahydrophthalate—the methyl ester of $\Delta^4$-9α:11β-dichloro-3β:17β-dihydroxy-17α-methyl-androstene-3-semi-tetrahydrophthalate, and From $\Delta^4$ - 9α:11β - dichloro - 3β:17β - dihydroxy - 17α-methyl - androstene - 3 - semi - sulfate—the methyl ester of $\Delta^4$-9α:11β-dichloro - 3β:17β - dihydroxy - 17α-methyl-androstene-3-semi-sulfate.

By an analogous reaction there are obtained from $\Delta^4$-9α - chloro - 11β - fluoro - 3β:17β - dihydroxy - 17α-methyl-androstene-3-semi-diglycollate, -succinate, -tetrahydrophthalate and sulfate, by reaction with diazomethane in methanol+ether, the methyl esters of $\Delta^4$-9α-chloro-11β - fluoro - 3β:17β - dihydroxy - 17α - methyl - androstene-3-semi-diglycollate, -succinate, -tetrahydrophthalate and -sulfate.

*Example 15*

A clear solution of 0.413 gram of 9α:11β-dichloro-17α-isobutyl-testosterone in 50 cc. of methanol and 10 cc. of ethyl acetate is cooled to —5° C., and 0.25 gram of sodium borohydride is tipped in; it dissolves rapidly with slight evolution of hydrogen after the flask has been rotated a few times. After 2-3 hours α:β-unsaturated ketone can no longer be detected in the ultra-violet spectrum, while a simultaneous spot test with silver nitrate still reveals the presence of excess sodium borohydride. The whole is kept overnight and then worked up as described in Example 1. Yield: 0.4 gram of $\Delta^4$ - 9α:11β-dichloro - 3β:17β - dihydroxy - 17α - isobutyl-androstene.

In an analogous manner there is obtained:

From 9α - bromo-11β - fluoro - 17α - isobutyl - testosterone—the $\Delta^4$ - 9α - bromo - 11β - fluoro - 3β:17β - dihydroxy-17α-isobutyl-androstene, From 9α - bromo - 11β - chloro - 17α - isobutyl-testosterone—the $\Delta^4$ - 9α - bromo - 11β - chloro - 3β:17β - dihydroxy - 17α - isobutyl - androstene, and From 9α - chloro - 11β - fluoro - 17α - isobutyl - testosterone—the $\Delta^4$ - 9α - chloro - 11β - fluoro - 3β:17β - dihydroxy - 17α - isobutyl - androstene.

*Example 16*

A solution of 0.387 gram of $\Delta^4$-9α:11β-dichloro-3β:17β-dihydroxy-17α-ethyl-androstene in 20 cc. of pyridine is treated with 10 cc. of acetanhydride and then heated for 5 hours at the boil. The clear reaction solution is cooled and poured over a mixture of ice and dilute hydrochloric acid. The mixture is kept overnight and the precipitated reaction product is suctioned off and washed with dilute hydrochloric acid and water, and dried. Yield: 0.4 gram of $\Delta^4$ - 9α:11β - dichloro - 3β:17β - dihydroxy - 17α-ethyl-androstene-3:17-diacetate.

In an analogous manner there are obtained by reacting $\Delta^4$ - 9α:11β - dichloro - 3β:17β - dihydroxy - 17α - ethyl-androstene With propionic anhydride—the $\Delta^4$ - 9α:11β - dichloro-3β:17β - dihydroxy - 17α - ethyl - androstene - 3:17-dipropionate, With cyclopentylpropionyl chloride—the $\Delta^4$-9α:11β-dichloro - 3β:17β - dihydroxy - 17α - ethyl - androstene-3:17-di-cyclopentylpropionate, and With cyclopropyl carboxylic acid chloride—the $\Delta^4$-9α:11β-dichloro - 3β:17β - dihydroxy - 17α - ethyl - androstene-3:17-di-cyclopropylformate.

*Example 17*

A solution of 0.387 gram of $\Delta^4$-9α:11β-dichloro-3β:17β-dihydroxy-17α-ethyl-androstene in 20 cc. of pyridine is treated with 5 cc. of acetanhydride and kept overnight at room temperature. The clear reaction solution is poured into ice-water and acidified with dilute hydrochloric acid. The precipitated reaction product is suctioned off, washed with dilute hydrochloric acid and water, and dried. Yield: 0.4 gram of $\Delta^4$-9α:11β-dichloro-3β:17β-dihydroxy-17α-ethyl-androstene-3-acetate.

In an analogous manner there are obtained by reacting $\Delta^4$ - 9α:11β - dichloro - 3β:17β - dihydroxy - 17α - ethyl-androstene With propionic anhydride—the $\Delta^4$ - 9α:11β - dichloro-3β:17β-dihydroxy-17α-ethyl-androstene-3-propionate, With trimethylacetic acid chloride—the $\Delta^4$-9α:11β-dichloro - 3β:17β - dihydroxy - 17α - ethyl - androstene-3-trimethyl-acetate, With cyclopentyl propionic acid chloride—the $\Delta^4$-9α:11β-dichloro - 3β:17β - dihydroxy - 17α - ethyl - androstene-3-cyclopentylpropionate, With diglycollic anhydride—the $\Delta^4$ - 9α:11β - dichloro-3β:17β - dihydroxy - 17α - ethyl - androstene - 3 - semi-diglycollate, and from it the water-soluble sodium salt of $\Delta^4$ - 9α:11β - dichloro - 3β:17β - dihydroxy - 17α-ethyl-androstene-3-semi-diglycollate, With tetrahydrophthalic anhydride—the $\Delta^4$-9α:11β-dichloro - 3β:17β - dihydroxy - 17α - ethyl - androstene- 3-semi-tetra-hydrophthalate, and from it the water soluble sodium salt of $\Delta^4$-9α-11β-dichloro-3β:17β-dihydroxy-17α-ethyl-androstene-3-semi-tetrahydrophthalate,
With cyclopropyl carboxylic acid chloride—the $\Delta^4$-9α:11β - dichloro - 3β:17β - dihydroxy - 17α - ethyl-androstene-3-cyclopropylformate, and
With undecylenic acid chloride—the $\Delta^4$-9α:11β-dichloro-3β:17β-dihydroxy-17α-ethyl-androstene-3-undecylenate.

Example 18

A clear solution of 0.368 gram of 9α-chloro-11β-fluoro-17α-ethyl-testosterone in 45 cc. of methanol and 8 cc. of ethyl acetate is cooled to −5° C., and 0.25 gram of sodium borohydride is tipped in which dissolves rapidly with slight evolution of hydrogen after the flask has been rotated a few times. The progress of the reduction is observed by periodically checking the ultra-violet absorption; after about 2 hours from the addition of the sodium borohydride, α:β-unsaturated ketone can no longer be detected in the ultra-violet spectrum, while a simultaneous spot test with silver nitrate still reveals the presence of excess sodium borohydride. The whole is kept overnight at 0° C. and then worked up as described in Example 1. Yield: 0.35 gram of $\Delta^4$-9α-chloro-11β-fluoro-3β:17β-dihydroxy-17α-ethyl-androstene.

In an analogous manner there are obtained:

From 9α:11β-dichloro-17α-ethyl-testosterone—the $\Delta^4$-9α:11β-dichloro-3β:17β-dihydroxy-17α-ethyl-androstene,
From 9α-bromo-11β-fluoro-17α - ethyl - testosterone—the $\Delta^4$-9α-bromo-11β-fluoro - 3β:17β - dihydroxy-17α-ethyl-androstene, and
From 9α-bromo-11β-chloro-17α - ethyl - testosterone—the $\Delta^4$-9α-bromo-11β-chloro-3β:17β - dihydroxy-17α-ethyl-androstene.

Example 19

A solution of 0.359 gram of $\Delta^4$-9α:11β-dichloro-3β:17β-dihydroxy-androstene in 15 cc. of pyridine is treated with 5 cc. of propionic anhydride and heated for 30 minutes under nitrogen on a boiling water bath. The clear reaction solution is cooled, poured into ice-water and acidified with dilute hydrochloric acid. The precipitated reaction product is suctioned off, washed with dilute hydrochloric acid, cold dilute sodium carbonate solution and finally with much water, and dried, to yield 0.45 gram of $\Delta^4$-9α: 11β-dichloro-3β:17β - dihydroxy - androstene-3:17-dipropionate.

In an analogous manner there are obtained by reacting $\Delta^4$-9α:11β-dichloro-3β:17β-dihydroxy-androstene, With trimethylacetic acid chloride—the $\Delta^4$-9α:11β-dichloro-3β:17β - dihydroxy - androstene-3:17-di-trimethylacetate,
With cyclopentylpropionic acid chloride—the $\Delta^4$-9α:11β-dichloro-3β:17β-dihydroxy - androstene-3:17-di-cyclopentylpropionate,
With succinic anhydride—the $\Delta^4$-9α:11β-dichloro-3β:17β-dihydroxy-androstene-3:17-di-semi-succinate, and from it the water-soluble sodium salt of $\Delta^4$-9α:11β-dichloro-3β:17β-dihydroxy-androstene-3:17-di-semi-succinate,
With diglycollic anhydride—the $\Delta^4$-9α:11β-dichloro-3β:17β-dihydroxy - androstene - 3:17-di-semi-diglycollate, and from it the water-soluble sodium salt of $\Delta^4$-9α:11β-dichloro-3β:17β - dihydroxy - androstene-3:17-di-semi-diglycollate,
With tetrahydrophthalic anhydride—the $\Delta^4$-9α:11β-dichloro-3β:17β - dihydroxy - androstene - 3:17-di-semi-tetrahydrophthalate, and from it the water-soluble sodium salt of $\Delta^4$-9α:11β-dichloro-3β:17β-dihydroxy-androstene-3:17-di-semi-tetrahydrophthalate,
With cyclopropyl carboxylic acid chloride—the $\Delta^4$-9α: 11β-dichloro-3β:17β - dihydroxy - androstene-3:17-di-cyclopropylformate, and
With undecylenic acid chloride—the $\Delta^4$-9α:11β-dichloro-3β:17β-dihydroxy-androstene-3:17-di-undecylenate.

Example 20

A solution of 0.385 gram of $\Delta^4$-9α:11β-dichloro-3β:17β-dihydroxy-androstene-17-acetate in 20 cc. of methanol is treated with 1.5 cc. of 0.1 N-potassium carbonate solution and kept overnight at room temperature. The hydrolysis products are precipitated by adding water, acidified with diluted acetic acid, suction-filtered, and washed with much water. After drying there is obtained 0.34 gram of $\Delta^4$-9α:11β-dichloro-3β:17β-dihydroxy-androstene.

Example 21

A solution of 0.385 gram of $\Delta^4$-9α:11β-dichloro-3β:17β-dihydroxy-androstene-17-acetate in 10 cc. of pyridine and 5 cc. of acetanhydride is kept overnight at room temperature and then poured into ice-water. The precipitated reaction product is collected on the suction filter, washed with much water and dried. Yield: 0.39 gram of $\Delta^4$-9α: 11β-dichloro-3β:17β - dihydroxy - androstene-3:17-diacetate. For analysis the product is recrystallized from ethyl acetate.

In an analogous manner there are obtained by reacting $\Delta^4$-9α:11β-dichloro - 3β:17β - dihydroxy-androstene-17-acetate With propionic anhydride — the $\Delta^4$-9α:11β-dichloro-3β:17β-dihydroxy-androstene-3-propionate-17-acetate.
With trimethylacetic acid chloride—the $\Delta^4$-9α:11β-dichloro-3β:17β - dihydroxy - androstene-3-trimethylacetate-17-acetate,
With cyclopentylpropionic acid chloride—the $\Delta^4$-9α:11β-dichloro-3β:17β-dihydroxy - androstene-3-cyclopentylpropionate-17-acetate,
With succinic anhydride—the $\Delta^4$-9α:11β-dichloro-3β:17β-dihydroxy-androstene-3-semi-succinate-17-acetate, and from it the water-soluble sodium salt of $\Delta^4$-9α:11β-dichloro-3β:17β-dihydroxy - androstene-3-semi-succinate-17-acetate,
With diglycollic anhydride—the $\Delta^4$-9α:11β-dichloro-3β: 17β-dihydroxy - androstene-3-semi-diglycollate-17-acetate, and from it the water-soluble sodium salt of $\Delta^4$-9α:11β-dichloro-3β:17β - dihydroxy - androstene-3-semi-diglycollate-17-acetate, and
With tetrahydrophthalic anhydride—the $\Delta^4$-9α:11β-dichloro-3β:17β - dihydroxy - androstene-3-semitetrahydrophthalate-17-acetate, and from it the water-soluble sodium salt of $\Delta^4$-9α:11β-dichloro-3β:17β-dihydroxy-androstene-3-semi-tetrahydrophthalate-17-acetate.

Example 22

A clear solution of 0.383 gram of 9α:11β-dichloro-testosterone-acetate in 50 cc. of methanol and 10 cc. of ethyl acetate is cooled to −5° C., and 0.25 gram of sodium borohydride is tipped in which dissolves rapidly with slight evolution of hydrogen after the flask has been rotated several times. The progress of the reduction is observed by periodically checking the ultra-violet absorption; about 2 hours after addition of the sodium borohydride, α:β-unsaturated ketone can no longer be detected in the ultra-violet spectrum, while a simultaneous spot test with silver nitrate reveals that excess sodium borohydride is still present. The whole is kept overnight at 0° C. and then worked up as described in Example 1. Yield: 0.3 gram of $\Delta^4$-9α:11β-dichloro-3β:17β-dihydroxy-androstene-17-acetate.

The reduction of the 3-oxo group can also be carried out with lithium tri-tertiary butoxy aluminium hydride.
In an analogous manner there are obtained:

From 9α:11β - dichloro - testosterone-propionate—the $\Delta^4$-9α:11β-dichloro-3β:17β-androstene-17-propionate,
From 9α:11β - dichloro-testosterone-trimethylacetate—the $\Delta^4$ - 9α:11β - dichloro-3β:17β-dihydroxy-androstene-17-trimethylacetate,
From 9α:11β - dichloro - testosterone-cyclopentylpropionate—the $\Delta^4$-9α:11β-dichloro-3β:17β-dihydroxy-androstene-17-cyclopentylpropionate, From 9α:11β-dichloro-testosterone-semi-succinate, -semi-diglycollate and -semi-tetrahydrophthalate—the Δ⁴-9α:11β-dichloro-3β:17β-dihydroxy-androstene-17-semisuccinate, -semi-diglycollate and -semi-tetrahydrophthalate, and From 9α:11β-dichloro-testosterone-undecylenate—the Δ⁴-9α:11β-dichloro-3β:17β-dihydroxy-androstene-17-undecylenate.

What is claimed is:

1. A compound selected from the group consisting of a dihalogenandrostene of the formula

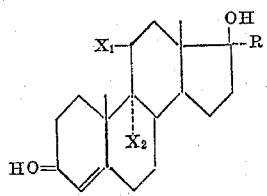

and its esters derived from acids having from 1 to 20 carbon atoms, in which $X_1$ stands for a member selected from the group consisting of a chlorine and fluorine atom, $X_2$ for a member selected from the group consisting of chlorine and bromine atom, R for a member selected from the group consisting of a hydrogen atom and a lower alkyl radical, having 1 to 6 carbon atoms.

2. Δ⁴-9α:11β-dichloro-3β:17β-dihydroxy-androstene.
3. Δ⁴ - 9α:11β - dichloro-3β:17β-dihydroxy-androstene-17-acetate.
4. Δ⁴ - 9α:11β - dichloro-3β:17β-dihydroxy-androstene-3:17-diacetate.
5. Δ⁴ - 9α - chloro - 11β - fluoro-3β:17β-dihydroxy-17α-methylandrostene.
6. Δ⁴ - 9α - chloro - 11β - fluoro-3β:17β-dihydroxy-17α-methylandrostene-3-acetate.
7. Δ⁴ - 9α - chloro - 11β - fluoro-3β:17β-dihydroxy-17α-methylandrostene-3-trimethylacetate.
8. Δ⁴ - 9α - chloro - 11β - fluoro-3β:17β-dihydroxy-17α-methylandrostene-3-semisuccinate.
9. Δ⁴ - 9α:11β - dichloro - 3β:17β-dihydroxy-17α-methyl-androstene.
10. Δ⁴ - 9α:11β - dichloro-3β:17β-dihydroxy-17α-methyl-androstene-3-semisuccinate.
11. Δ⁴ - 9α:11β - dichloro-3β:17β-dihydroxy-17α-methyl-androstene-3-benzoate.
12. Δ⁴ - 9α:11β - dichloro-3β:17β-dihydroxy-17α-methyl-androstene-3-semisulfate.
13. The methyl ester of Δ⁴-9α:11β-dichloro-3β:17β-dihydroxy-17α-methyl-androstene-3-semisuccinate.
14. Δ⁴ - 9α - chloro - 11β-fluoro-3β:17β-dihydroxy-17α-ethylandrostene.
15. Δ⁴ - 9α:11β - dichloro-3β:17β-dihydroxy-17α-methyl-androstene-3-acetate.
16. Δ⁴ - 9α:11β - dichloro-3β:17β-dihydroxy-17α-ethyl-androstene-3:17-diacetate.
17. Δ⁴ - 9α:11β - dichloro - 3β:17β - dihydroxy-17α-isobutyl-androstene.
18. A pharmaceutical composition comprising a compound of claim 1, containing the active ingredient in an amount ranging from 0.03–60% together with a suitable pharmaceutical carrier.
19. A pharmaceutical composition of claim 18, containing the active ingredient in an amount ranging from 0.03–60% together with a suitable pharmaceutical carrier in the form of a tablet.
20. A pharmaceutical composition of claim 18, containing the active ingredient in an amount ranging from 0.03–60% together with a suitable pharmaceutical carrier in the form of an oil ampoule.
21. A pharmaceutical composition of claim 18, containing the active ingredient in an amount ranging from 0.03–60% together with a suitable pharmaceutical carrier in the form of an ampoule containing an aqueous solution.

References Cited in the file of this patent

Corey: J.A.C.S., 75, 4832–4834 (1953), page 4833 depended upon.
Fieser et al.: J.A.C.S., 75, 4837–4839 (1953), page 4837 depended upon.

UNITED STATES PATENT OFFICE
CERTIFICATE OF CORRECTION

Patent No. 3,012,939            December 12, 1961

Albert Wettstein et al.

It is hereby certified that error appears in the above numbered patent requiring correction and that the said Letters Patent should read as corrected below.

Column 4, line 32, for "3β:17-" read -- -3β:17β- --; line 37, for "3β-17β-" read -- 3β:17β- --; line 41, for "-3-methyl-" read -- -3-trimethyl- --.

Signed and sealed this 21st day of August 1962

(SEAL)
Attest:

ESTON G. JOHNSON            DAVID L. LADD
Attesting Officer            Commissioner of Patents

UNITED STATES PATENT OFFICE
CERTIFICATE OF CORRECTION

Patent No. 3,012,939            December 12, 1961

Albert Wettstein et al.

It is hereby certified that error appears in the above numbered patent requiring correction and that the said Letters Patent should read as corrected below.

Column 11, lines 12 to 19, the formula should appear as shown below instead of as in the patent:

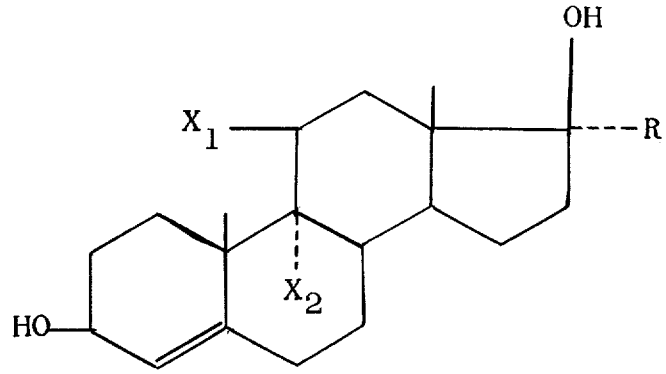

Signed and sealed this 12th day of March 1963.

(SEAL)
Attest:

ESTON G. JOHNSON                               DAVID L. LADD

Attesting Officer                         Commissioner of Pater'